United States Patent [19]

Ueno et al.

[11] Patent Number: 5,464,539
[45] Date of Patent: Nov. 7, 1995

[54] PROCESS FOR THE PRODUCTION OF HYDROGEN BY MICROORGANISMS

[75] Inventors: Yoshiyuki Ueno; Masayoshi Morimoto; Seiji Ootsuka; Tatsushi Kawai; Susumu Satou, all of Tokyo, Japan

[73] Assignees: Kajima Corporation, Tokyo; Research Institute of Innovative Technology for the Earth, Kyoto, both of Japan

[21] Appl. No.: 229,100

[22] Filed: Sep. 2, 1994

[30] Foreign Application Priority Data

Sep. 7, 1993 [JP] Japan ............................. 5-246134

[51] Int. Cl.$^6$ ................ C02F 3/28; C01B 3/02; C01B 3/22
[52] U.S. Cl. ............... 210/603; 210/612; 48/197 A
[58] Field of Search ............. 48/197 A; 210/603, 210/605, 610, 630, 612; 423/648.1

[56] References Cited

U.S. PATENT DOCUMENTS

| | | | |
|---|---|---|---|
| 1,777,449 | 10/1930 | Rath | 48/197 A |
| 2,188,847 | 1/1940 | Streander | 210/603 |
| 3,698,881 | 10/1972 | White | 210/603 |
| 3,711,392 | 1/1973 | Metzger | 210/603 |
| 4,249,929 | 2/1981 | Kneer | 210/630 |
| 4,332,904 | 6/1982 | Kurane et al. | 210/617 |
| 4,749,494 | 6/1988 | Tomoyasu et al. | 210/630 |
| 4,793,855 | 12/1988 | Hauk | 48/197 A |
| 4,904,388 | 2/1990 | Baba et al. | 210/605 |
| 4,934,286 | 6/1990 | Fowler | 48/197 A |
| 5,188,740 | 2/1993 | Khan | 48/197 A |

FOREIGN PATENT DOCUMENTS

| | | | |
|---|---|---|---|
| 59-36598 | 2/1984 | Japan | 210/605 |
| 5254801 | 10/1993 | Japan | 423/648.1 |
| 2205825 | 12/1988 | United Kingdom | 210/605 |

OTHER PUBLICATIONS

Abstract; Kaishi, *Studies on Hydrogen Production By Anaerobic Microorganism (Part 2)*, Japan Society for Bioscience, Biotechnology, and Agrochemistry, vol. 67, No. 03, Mar. 1993.

Article; Takahara, *Microorganisms Contributing to Industrial Development Principal Role in Biotechnology*, Hakua Shoba, pp. 182–185, Dec. 25, 1983.

Abstract; *Sixth European Congress on Biotechnology*, vol. III, Wednesday, 16 Jun. 1993.

Abstract; *Studies on Hydrogen Production By Anaerobic Microorganisms (Part 3)*, Congress of the Society for Fermentation and Bioengineering, Japan; Dec. 1993.

Abstract; Studies on Hydrogen Production By Anaerobic Microorganisms (Part 1), The Society for Fermentation and Bioengineering, Japan; Nov. 1992.

*Primary Examiner*—Peter A. Hruskoci
*Assistant Examiner*—Theodore M. Green
*Attorney, Agent, or Firm*—Browdy and Neimark

[57] ABSTRACT

The present invention relates to a process for the production of hydrogen comprising treating in an anaerobic condition a substrate such as waste water including organic matter using sludge compost, whereby stable hydrogen generation at a higher efficiency for a longer period of time is attained together with the treatment of waste water.

6 Claims, 1 Drawing Sheet

PROCESS FOR THE PRODUCTION OF HYDROGEN BY MICROORGANISMS

BACKGROUND OF THE INVENTION

1. Field of the Invention

Hydrogen is clean energy that does not discharge carbon dioxide even after its combustion, and additionally, its exothermic energy per unit weight is three fold higher than that of petroleum.

Also, hydrogen may be modified into a form of electric energy by its supply into fuel cells.

The present invention relates to a process for the production of hydrogen during the process of treating a variety of substrates, for example, waste water containing highly concentrated organic matter, by using an anaerobic microflora (a group of microorganisms), whereby the present invention serves for the treatment of waste water and hydrogen generation. Therefore, the present invention not only plays an important role in generating hydrogen for the energy industries but also plays an important role industrially for waste water treatment and pollution management.

2. Prior Art

Hydrogen is currently produced by thermal naphtha decomposition or by water electrolysis. Because these processes consume fossil fuel, however, they generally do not serve for improving the global environment. It is also expected that the consumption of fossil fuel will be reduced in the future.

Alternatively, hydrogen generation using microorganisms is grouped into two types; (1) a process employing a photosynthetic microorganism and; (2) a process employing an anaerobic microorganism. The former process, which depends on photosynthetic energy may be complex and inefficient as well as costly. Additionally, the hydrogen generation rate by such microorganisms is slow. Furthermore, the substrate for hydrogen generation is limited. Thus, the former process has a great number of problems, and has not yet been applied in practice (see Yoshimasa Takahara, "Microorganisms contributing to industrial development—Principal role in biotechnology" Hakua Shobo, published Dec. 25, 1983, p. 182–185).

Hydrogen generation by means of anaerobic microorganisms is classified in either the process using a microflora such as digested sludge and lumen bacteria or the process using pure cultures of bacteria; the latter process for waste water treatment is far from reaching a practical stage, because the range of substrate is limited and the process requires sterile conditions, and the like.

On the other hand, in the process which uses a microflora (a mixed population of microorganisms), the microflora can be adapted to a wide variety of substrates without requiring sterile procedures; additionally various waste waters may be used as substrates for hydrogen generation.

Although a number of reports have been published on hydrogen generation by anaerobic microfloras, many of the problems concerning hydrogen productivity and stability are still unsolved.

Problems to be Solved by the Invention

Taking into account the current state of the art described above, the present invention has achieved the objective of developing a novel system capable of stably generating hydrogen at a higher efficiency for a long period of time as well as the objective of developing a novel system capable of treating various industrial wastes with a higher efficiency.

Means for Solving the Problems

Figure 1:
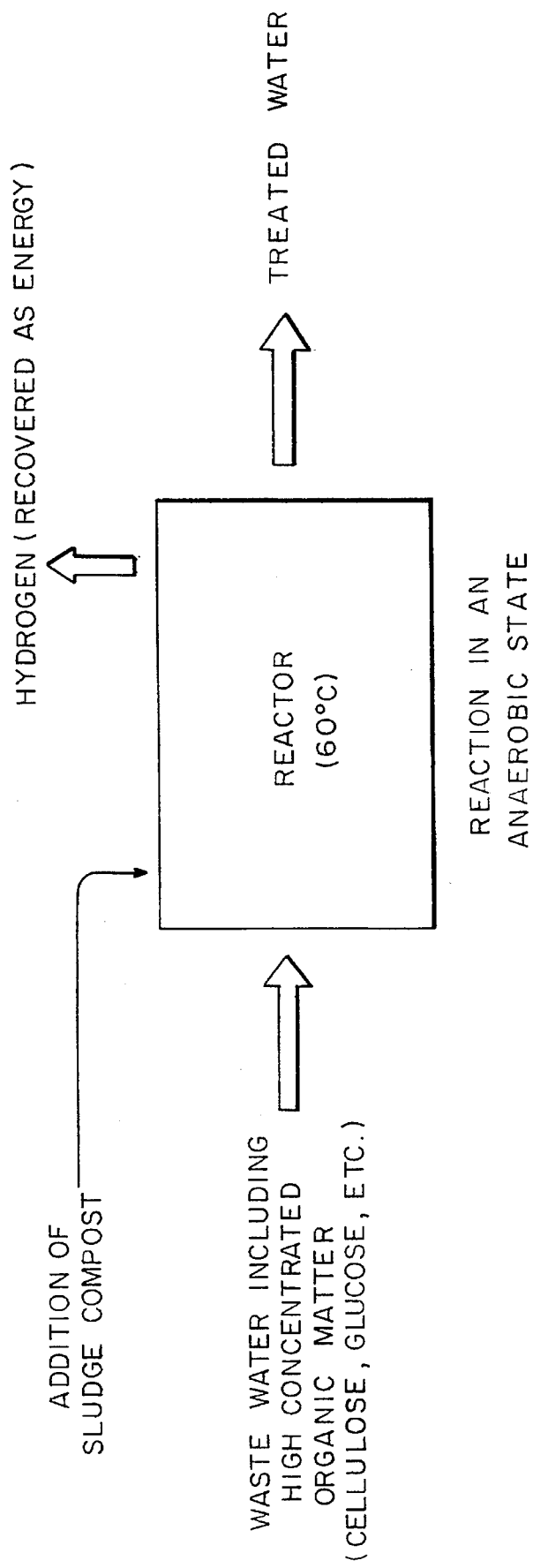
FIG. 1 depicts the process for generating hydrogen by microorganisms in accordance with the present invention.

A wide variety of investigations were done to attain the above objectives and as a result the present invention was achieved. The present invention is based on a fundamental technical concept of a method for stably generating hydrogen at a higher efficiency for a long period of time using the microorganisms in sludge compost as microflora.

Any of the sludge compost produced by forcing aeration into sewage treatment sludge and thereby rapidly preparing the sludge into compost is referred to as the sludge compost to be used in accordance with the present invention. Such sludge compost can be produced by any of a variety of methods; for example, when the water content of the waste which contains organic matter is adjusted by adding to the waste a carbon source, such as rice husks and sawdust if necessary, by further adding to the waste a part of a compost product if necessary, and by feeding the resulting mixture into a fermenter from the top while aerating the mixture from the bottom for compost preparation, crude compost is produced. For continuous compost preparation, the raw material feeding from the top and the recovery of crude compost from the bottom should be synchronized. During the compost preparation described above, the temperature is elevated so that hazardous pathogenic bacteria are deactivated. As the sludge compost in accordance with the present invention, the crude compost drawn out from the fermenter may be used as is, or the crude compost may be prepared into a fully fermented compost, after post-fermentation such as open-air storage for one to several months.

Whether the sludge compost is a crude compost or a fully fermented compost, the sludge compost thus prepared does not contain methane producing bacteria which are deactivated in contact with oxygen. Thus, while methane producing bacteria are deactivated in the presence of oxygen, most hydrogen-generating anaerobic bacteria are not killed when in contact with oxygen; as the hydrogen-generating bacteria are facultative anaerobes or are spore-forming bacteria, these bacteria are still alive even after contact with oxygen. Thus, hydrogen-generating survive the contact with oxygen and are present in the compost. In other words, if waste water and other substrates are later treated under anaerobic conditions, hydrogen generation is exclusively facilitated by the action of hydrogen generating bacteria with no occurrence of the methane fermentation which generally occurs during anaerobic treatment of waste water. Therefore, in accordance with the present invention, hydrogen generation is realized at an exceedingly high efficiency.

So as to generate hydrogen in accordance with the present invention, waste water or other various substrates are brought sufficiently into contact with the sludge compost in an anaerobic atmosphere to generate hydrogen which can then be collected. When waste water is used as the substrate, waste water treatment is carried out together with the generation of hydrogen, making the present invention extremely useful in a practical sense.

In order to practice the present invention as shown in FIG. 1 as an example and without limitation, a substrate is charged into a fermenter or a bioreactor, followed by the addition of the sludge compost (0.01 to 20% w/v, preferably at 0.5 to 5% w/v, without specific limitation). An anaerobic atmosphere is obtained by following a routine method, such as sealing the gas phase with $N_2$ gas or the like. The sludge compost then is maintained at a temperature suitable for the growth thereof (generally at about 40° to 70° C., the temperature varying depending on the type of the sludge compost), with the reaction progressing while stirring if necessary.

As the reaction progresses, hydrogen is generated. While substrate decomposition is carried out, the hydrogen generated is recovered as energy. When waste water is employed as the substrate for example, it is treated by the process to yield clean water.

Waste water discharged from manufacturing plants such as agricultural plants, juice plants, food plants, chemical plants and the like, waste water containing organic matter such as sewage water, urine and the like, and artificial substrates routinely employed for the culture of microorganisms and comprising a carbon source, a nitrogen source, minerals, vitamins etc. can be used as substrate. In order for hydrogen generation and liquid waste treatment to proceed in a smooth fashion, appropriate dilution, mixing or the like, and addition of required components may need to be done, for appropriate adjustment of these substrates.

The present invention will now be explained in detail in the following examples.

EXAMPLE 1

A 1% w/v of sludge compost was added to an artificial liquid waste having a composition of 1.5 g $KH_2PO_4$, 4.2 g $Na_2HPO_4.H_2O$, 0.5 g $NH_4Cl$, 0.18 g $MgCl_2.6H_2O$, 5 g yeast extract, 10 g cellulose powder, and 1 liter of distilled water, followed by sealing the gas phase with $N_2$ gas. The resulting mixture was maintained at 60° C. in an anaerobic condition.

As a result, 73% of the cellulose powder in the artificial liquid waste was decomposed and removed in 96 hours, with the generation of 1908 ml of hydrogen gas. The efficiency of hydrogen generation in the present example was 1.89 moles of hydrogen per mole of cellulose decomposed.

EXAMPLE 2

The artificial waste water as described in Example 1 was maintained at pH 6.5 for treatment under the same conditions. As a result, about 98% of the cellulose powder was decomposed in 120 hours, with the generation of 2613 ml of hydrogen gas.

EXAMPLE 3

For anaerobic treatment, the sludge compost was inoculated into waste water from a food plant, which contains sugars as the major component of its composition (TOC; 40,000 mg/l) and having been discharged at the rate of 1 $m^3$/day. While maintained at pH 6.5, the resulting mixture was subjected to continuous operation for a six day reaction period.

As a result, hydrogen gas was generated at a rate of 3.18 $m^3$/day over a period of 3 months. The removal rate of sugars contained in waste water was above 99%.

EXAMPLE 4

A 0.5% w/v sludge compost as microflora was inoculated into 3 liters of a CT medium containing 1% cellulose powder (Product Name; Funacell SF) as a carbon source and then cultured under anaerobic conditions with agitation.

The following measurements were done over time: pH of the medium by the glass electrode method; VSS (insoluble organic substances) by the sewage water testing method; lower $C_2$ to $C_8$ fatty acids by the gas chromatography FID method; TOC (total organic carbons) with a total organic carbon tester. The gas generated gas was quantitatively assayed by the substitution method on water using water below pH 3, and its composition was analyzed by the gas chromatography TCD method.

As a result, the cellulose in the medium was nearly solubilized and fermented during a 96-hour culture, with the generation of 9507 ml of gas. The gas composition was as follows; hydrogen at 59% and carbon dioxide gas at 41%. As the generation of the gas processed, the pH of the medium decreased from pH 6.82 to pH 4.78. The lower fatty acids produced were mainly acetic acid and lactic acid. These results indicate that the generation of hydrogen possibly occurred during the fermentation to produce the mixture of acetic acid and lactic acid.

Effect of the Invention

The present invention relates to a method for generating hydrogen using an organic substrate. As one of the embodiments, a method for generating hydrogen during the process of treating waste water is described. In conventional anaerobic waste water treatment, the hydrogen gas generated is converted into methane by methane producing bacteria as a final stage in methane fermentation.

Provided that the anaerobic treatment is done using a microflora lacking in methane producing bacteria, waste water can be decomposed into hydrogen, carbon dioxide gas and organic acids without methane generation.

Because sludge compost that is rapidly prepared does not contain methane producing bacteria, the compost should be of a microflora suitable for recovering hydrogen gas during the process of treating waste water.

As the first process to be drawn to such sludge compost, the present invention has successfully achieved stable hydrogen generation at a far higher efficiency over a long period of time. Particularly, the effect cannot be estimated with respect to energy generation alone. If waste water is used as a substrate for sludge compost, not only would hydrogen be generated but the efficient treatment of waste water would also be achieved. Thus, the present invention is excellent as both a means for pollution control management and energy generation.

What is claimed is:

1. A process for the microbial production of hydrogen gas, comprising the steps of:

(a) providing a sludge compost containing hydrogen-generating anaerobic bacteria and deactivated methane producing bacteria which has been prepared by forcing aeration into a sewage treatment sludge;

(b) contacting a liquid waste containing organic matter with said sludge compost in an anaerobic atmosphere by adding about 0.01 to 20% w/v of said sludge compost to said liquid waste to generate hydrogen gas; and (c) collecting said generated hydrogen gas.

2. The process according to claim 1, wherein said sludge compost in step (a) is a crude compost 3. The process according to claim 1, wherein said sludge compost in step (a) is a fully fermented compost which has been prepared by keeping a crude compost, formed from said sludge compost, in open air storage for a period of about one to several months.

4. The process according to claim 1, wherein said step (b)

of contacting said liquid waste with said sludge compost is maintained at a temperature in the range of about 40° C. to 70° C.

5. The process according to claim 1, wherein said step (b) of contacting said liquid waste with said sludge compost is carried out with stirring of said liquid waste with said sludge compost.

6. The process according to claim 1, wherein said liquid waste is waste water.

* * * * *